(No Model.)

G. W. BOYD.
LUBRICATOR.

No. 507,409. Patented Oct. 24, 1893.

Witnesses,
G. H. Strouse
J. A. Bayless

Inventor,
George W. Boyd
By Dewey & Co.
attys

UNITED STATES PATENT OFFICE.

GEORGE W. BOYD, OF SAN FRANCISCO, CALIFORNIA, ASSIGNOR OF ONE-HALF TO FINDLEY BUCHANAN AND PATRICK H. BUCHANAN, OF SAME PLACE.

LUBRICATOR.

SPECIFICATION forming part of Letters Patent No. 507,409, dated October 24, 1893.

Application filed July 3, 1893. Serial No. 479,521. (No model.)

*To all whom it may concern:*

Be it known that I, GEORGE W. BOYD, a citizen of the United States, residing in the city and county of San Francisco, State of California, have invented an Improvement in Lubricators; and I hereby declare the following to be a full, clear, and exact description of the same.

My invention relates to that class of lubricators in which the lubricant is contained within a cup, and is forced therefrom by means of a spring-actuated plunger carried by the cap and operating within the cup, said plunger being controlled by means of an exterior nut upon its stem.

My invention consists in the novel details of construction which I shall hereinafter fully describe and specifically claim, and which result in several improvements in the operation of said lubricator.

The objects of these improvements are, first, to provide for the admission of air to the cup when the plunger is relieved from its pressure upon the lubricant, for any purpose, as for refilling, thereby avoiding the back suction which is disadvantageous in withdrawing the lubricant from the journal, leaving it dry; second, to provide a simple and effective valve for controlling the discharge of the lubricant; and, third, to provide a simple means by which the lubricator may be attached to the spoke of a wheel when said lubricator is used for lubricating the journal or spindle of a wheel hub.

Figure 1:
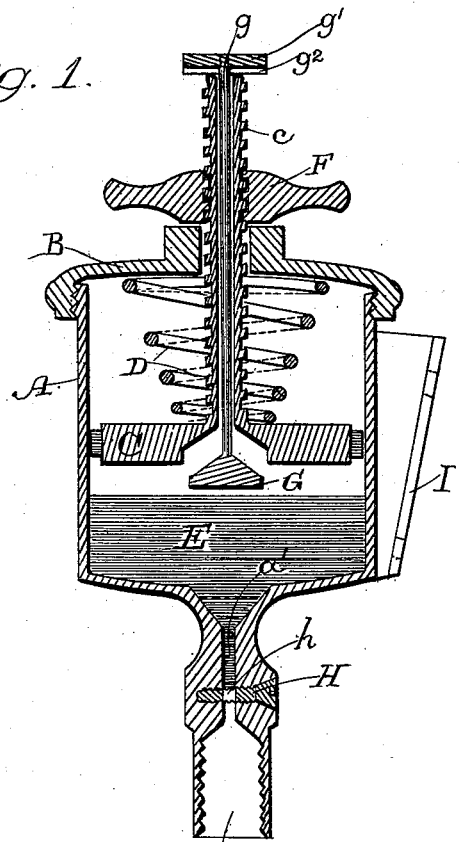
Figure 2:
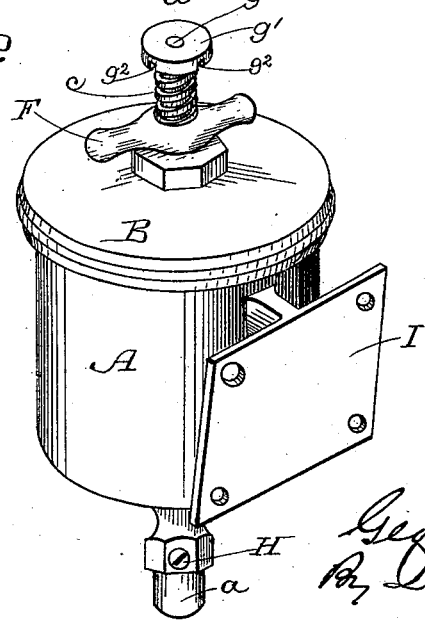

Referring to the accompanying drawings for a more complete explanation of my invention,—Figure 1 is a vertical section of my lubricator, the plunger being shown withdrawn from the surface of the lubricant, in order to show the opening of the valve G. Fig. 2 is a perspective view of my lubricator.

A is a cup having projecting from it a pipe, $a$ in which is the discharge passage $a'$, said pipe being constructed to receive any suitable connection by which the lubricant is conveyed to the part to be lubricated.

B is the cap of the cup adapted to be screwed thereon.

C is a plunger which works within the cup, and D is a spring located between the inner surface of the cap and the outer surface of the plunger, and bearing on the latter, whereby its tendency is to force said plunger inwardly and keep it constantly pressing upon the lubricating material represented by E, which is confined within the cup, and is by the action of the plunger forced outwardly through the discharge passage. This spring and its effect upon the plunger are controlled by means of a plunger stem $c$ which passes freely through the cap and is externally threaded, receiving upon its outer end a thumb nut F. Now, by turning this thumb nut down upon the screw to its utmost limit, the plunger is drawn backwardly to the cap and in this position, the cap is screwed upon the cup, which is previously filled with the lubricant. As lubricant is needed, the thumb nut is turned backwardly whereby the spring is permitted to force the plunger forwardly against the lubricant and thereby by pressure, force it out the discharge passage.

In lubricators of this character, I have found a serious defect, namely, that when for any purpose the plunger is withdrawn from its pressure upon the lubricant, as, for instance, by turning the nut down again or by unscrewing the cap to remove the plunger, for the refilling of the cup, back suction takes place, due to the withdrawal of the plunger, which has the effect of withdrawing the lubricant from the passage $a'$, and also from the journal to be lubricated, leaving the latter temporarily dry. To remedy this defect I have the following construction: The stem $c$ of the plunger is made hollow and through it is passed a valve stem $g$ carrying upon its inner end a valve G which is seated upon the inner surface of the plunger. Upon the outer end of the valve stem is a stop disk $g'$ which allows for a sufficient movement of the stem to permit the valve to open the aperture through the plunger and its stem; and said stop disk does not fit closely the upper end of the stem $c$ as by the provision of grooves $g^2$ in said disk air can at all times readily enter. As long as the plunger presses on the lubricant, the valve remains closed, but when the plunger is withdrawn from the surface of the lubricant, it is obvious that the air entering through the hollow stem of the plunger will force the valve open and prevent the vacuum which would otherwise result. Therefore, by this construction, there is no back suction upon the lubricant which will draw it away from the journal.

In order to control the discharge passage of the cup I have a valve H in the shape of a common screw which is seated in the discharge pipe, and traverses the passage $a'$, said screw having within it a port $h$ which by a slight movement of the screw will open or close the passage or control it at any intermediate point.

By making the valve in the shape of a screw, it can be fitted tightly to its seat without the least danger of loosening or turning except under proper force when desired.

In order to adapt the lubricator for attachment to common wheels, I cast or form with the cup A a securing plate or flange I which may be readily bent and secured to the spoke of the wheel.

Having thus described my invention, what I claim as new, and desire to secure by Letters Patent, is—

1. In a lubricator having a cup for containing the lubricant and a plunger operating in said cup against the lubricant whereby it is forced outwardly, a gravity air valve in said plunger controlling a passage to the exterior air means for withdrawing the plunger whereby the air valve will be automatically opened by the withdrawal of the plunger from the lubricant and be closed by the pressure of said plunger on the lubricant, substantially as herein described.

2. The combination with the oil cup and the piston having the hollow stem, of the valve provided with a stem extending up through said hollow stem and provided with a head or stop crossing the upper end of the hollow stem and grooved on its lower surface to form an air passage, substantially as herein described.

3. In a lubricator, the combination of a cup having a discharge passage, a spring-controlled plunger operating within the cup and pressing upon the lubricant therein, a hollow externally threaded stem of said plunger and a nut on the stem for controlling the plunger, a valve seated in the plunger and controlling the inner end of the hollow stem thereof, a stem secured to said valve and passing outwardly through the hollow stem of the plunger, and a suitable stop upon the outer end of said valve stem, air passages being formed between the lower face of the stop and upper extremity of the hollow stem substantially as herein described.

In witness whereof I have hereunto set my hand.

GEORGE W. BOYD.

Witnesses:
S. H. NOURSE,
J. A. BAYLESS.